(12) United States Patent
Hutton

(10) Patent No.: US 6,954,959 B2
(45) Date of Patent: Oct. 18, 2005

(54) SUPPLEMENTAL LIFT SYSTEM FOR AN OVER-THE-WING PASSENGER BOARDING BRIDGE

(75) Inventor: Neil Hutton, Ottawa (CA)

(73) Assignee: DEW Engineering and Development Limited, Ottawa (CA)

(*) Notice: Subject to any disclaimer, the term of this patent is extended or adjusted under 35 U.S.C. 154(b) by 0 days.

(21) Appl. No.: 10/383,288

(22) Filed: Mar. 7, 2003

(65) Prior Publication Data

US 2004/0172777 A1 Sep. 9, 2004

(51) Int. Cl.$^7$ ................................................. B64F 1/305
(52) U.S. Cl. ........................................ 14/71.5; 14/71.3
(58) Field of Search ................................ 14/71.1, 71.3, 14/71.5, 71.7

(56) References Cited

U.S. PATENT DOCUMENTS

| | | | | |
|---|---|---|---|---|
| 3,163,873 | A | * | 1/1965 | Hopkins ..................... 14/71.1 |
| 3,538,529 | A | | 11/1970 | Breier |
| 3,722,017 | A | * | 3/1973 | Gacs et al. ................... 14/71.5 |
| 3,834,562 | A | * | 9/1974 | Norrie ......................... 414/344 |
| 4,392,769 | A | * | 7/1983 | Lowery ....................... 414/397 |
| 5,040,257 | A | * | 8/1991 | Bentz ............................. 14/70 |
| D327,951 | S | | 7/1992 | Anderberg |
| 6,496,996 | B1 | * | 12/2002 | Worpenberg et al. ........ 14/71.5 |
| 6,526,615 | B1 | * | 3/2003 | Hutton et al. ................ 14/71.5 |

FOREIGN PATENT DOCUMENTS

| | | |
|---|---|---|
| DE | 100 46 010 A1 | 3/2002 |
| WO | WO 00/09395 A2 | 2/2000 |

OTHER PUBLICATIONS

"Dual bridges may shorten Southwest's turnaround" Dallas Business Journal, May 22, 2000.
"Easy come, easy go" AE & T Autumn 2001, pp. 3–5.
Fabriksmonteringin Trelleborg AB website: http://www.fmt.se (pages of particular relevance attached).
Information relating to possible public use (see attached photos).
"Southwest Takes Back Door to Beat Deplaning Record" Texas Journal, dae unknown.
"Southwest Tests First Narrowbody Dual Boarding Bridges" Business Week Daily, date unknown.
"Southwest tests twin loading system; airline trying dual boarding of passengers at Love Field" Star-Telegram—Mar. 7, 2000.

* cited by examiner

Primary Examiner—Gary S. Hartmann
(74) Attorney, Agent, or Firm—Freedman & Associates

(57) ABSTRACT

Disclosed is a supplemental lift system for use with an aircraft passenger boarding bridge of a type that includes a tunnel section for being extended over the wing of an aircraft in a cantilever-like fashion. The supplemental lift system is for use in an event that a main elevating mechanism of the passenger boarding bridge is other than operable, such that the over the wing portion of the boarding bridge may be moved out of the way of a wing of the aircraft, permitting the same to move in a direction away from the boarding bridge. A preferred embodiment of the supplemental lift system comprises at least a jack including a first portion that is mounted to the aircraft passenger boarding bridge at a point that is distal from an outboard end thereof. The at least a jack further comprises a second portion having a first end for being telescopically received within the first portion such that a length of the jack is variable, and a second end for engaging an area of the ground that is elevationally below the aircraft passenger boarding bridge. The supplemental lift system also includes a power source in communication with the at least a jack for providing the power required for extending the length of the jack.

23 Claims, 4 Drawing Sheets

SUPPLEMENTAL LIFT SYSTEM FOR AN OVER-THE-WING PASSENGER BOARDING BRIDGE

FIELD OF THE INVENTION

The instant invention relates generally to passenger boarding bridges including a section for being cantilevered over a wing of an aircraft so as to engage a rear doorway of the aircraft, and more particularly to a supplemental lift system for use with such passenger boarding bridges.

BACKGROUND OF THE INVENTION

Over-the-wing passenger boarding bridges for servicing aircraft doorways located above or behind the wing are known in the art (U.S. Pat. No. 6,496,996, DE 10046010, WO 0009395, U.S. Pat. No. 3,538,529, U.S. Pat. No. 3,722,017). Each prior art solution provides a tunnel section that is supported in a cantilever-like fashion by an overhead support system, such that the tunnel section is positionable over the wing of the aircraft for engaging a rear doorway that is located above or behind the wing. To this end, the tunnel section typically includes at least a telescopic portion including a cab mounted at an outboard end thereof, the cab for being aligned with the rear doorway of the aircraft. In general, the tunnel section is supported at a minimum safe height above the wing, so as to provide as nearly a horizontal walking surface as possible for passengers walking therethrough. Furthermore, often the cab engages the rear doorway of the aircraft at a height above the apron that is insufficient to allow the aircraft to move away from the terminal building in the event that the over-the-wing passenger boarding bridge loses power or suffers a mechanical failure of a main elevating mechanism. During such an event, the departure of the aircraft may be delayed indefinitely while repairs are being attempted.

The above-mentioned problem is most serious for those prior art solutions that include a massive external support structure for supporting the tunnel section over the wing of the aircraft. Examples of such systems include U.S. Pat. No. 6,496,996, WO 0009395, and U.S. Pat. No. 3,538,529. In particular, the support structure is permanently mounted to the apron surface and includes a horizontally moveable extension arm that is connected to the tunnel section via variable length mechanisms. Accordingly, vertical movement of the cab mounted at the outboard end of the tunnel section can be effected only as a result of actuation of the variable length mechanisms. If the variable length mechanisms fail, then the tunnel section can only be moved along an arcuate path in a horizontal plane. Unfortunately, the design of most modern commercial aircraft wings makes it unsafe to pivot the cab away from the aircraft without also simultaneously elevating the cab above the height of certain features of the aircraft wing.

In DE 10046010, disclosed is an over-the-wing bridge including a telescoping tunnel section that is pivotally mounted at an outboard end of a radial bridge. An overhead adjustable support system is provided including an elaborate assembly of support rods, which is disposed both above and below portions of the telescoping tunnel section and the radial bridge, for supporting the telescoping tunnel section in a height adjustable manner. The over-the-wing bridge that is disclosed in DE 10046010 suffers from many of the same limitations that were described above with reference to U.S. Pat. No. 6,496,996, WO 0009395, and U.S. Pat. No. 3,538,529. However, the shorter length of the cantilevered tunnel section combined with the generally lighter weight construction of the overhead adjustable support system would make this bridge easier to manually move out of the way in the event of mechanical failure or power loss. It is a disadvantage that the aircraft would be unacceptably delayed in departing whilst preparations are being made to manually adjust the bridge. Of course, depending upon the nature of the failure, such a manual adjustment may be deemed unsafe and it would become necessary to either repair the bridge or transfer passengers to another aircraft, when available, for departure.

In fact, the above-mentioned problem is unique to the over-the-wing passenger boarding bridges. For instance, apron drive bridges, radial bridges, and the like typically do not engage an aircraft at a point behind the wing, such that the aircraft may depart even when the boarding bridge cannot be retracted in a normal fashion. Furthermore, an apron drive bridge or a radial bridge may be towed safely away from the aircraft using a tractor or another available ground vehicle. It will be obvious to one of skill in the art that prior art teachings relating to non-over-the-wing passenger boarding bridges do not address the above-mentioned problem associated with the over-the wing passenger boarding bridges.

It would be advantageous to provide a supplemental lift system for use with an over the wing passenger boarding bridge that overcomes the above-mentioned limitations of the prior art.

SUMMARY OF THE INVENTION

In accordance with an aspect of the instant invention there is provided a passenger boarding bridge including a tunnel section for being extended over the wing of an aircraft in a cantilever-like fashion, the passenger boarding bridge comprising: a main elevating mechanism mounted to a wheel carriage of the passenger boarding bridge for supporting the tunnel section in a height adjustable manner; at least a jack including a first portion mounted to the aircraft passenger boarding bridge at a point that is distal from an outboard end thereof, and a second portion having a first end for being telescopically received within the first portion such that a length of the jack is variable, and a second end for engaging an area of the ground that is elevationally below the aircraft passenger boarding bridge; and, a power source in communication with the at least a jack for providing power for extending the length of the jack.

In accordance with an aspect of the instant invention there is provided a supplemental lift system for an aircraft passenger boarding bridge including a tunnel section for being extended over the wing of an aircraft in a cantilever-like fashion, the tunnel section supported in a height adjustable manner by an elevating mechanism mounted to a wheel carriage, the supplemental lift system comprising: a plurality of height-adjustable jacks mounted to a wheel carriage of an aircraft passenger boarding bridge, each height-adjustable jack of the plurality of height-adjustable jacks including a ground engaging end and being operable between a retracted position in which the ground engaging end other than supports a substantial portion of a weight of a passenger boarding bridge and an extended position in which the ground engaging end supports a substantial portion of a weight of a passenger boarding bridge.

In accordance with an aspect of the instant invention there is provided a method of elevating an outboard end of an over-the-wing passenger boarding bridge comprising the steps of: providing a source of power for extending a length of at least a jack, the at least a jack mounted to a portion of the over-the-wing passenger boarding bridge at a point that is distal from the outboard end; and, extending the length of the at least a jack by an amount that is sufficient to engage the ground and to elevate the outboard end so as to provide a minimum safe clearance between a lower surface of the over-the-wing passenger boarding bridge and an upper surface of a wing of an aircraft.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. Throughout the detailed description and in the claims, it is to be understood that the following definitions shall be accorded to the following terms. The term 'inboard end' refers to that end of a passageway nearest a stationary structure, for instance one of a terminal building and a stationary rotunda. The term 'outboard end' refers to that end of a passageway nearest an aircraft doorway.

Figure 1:
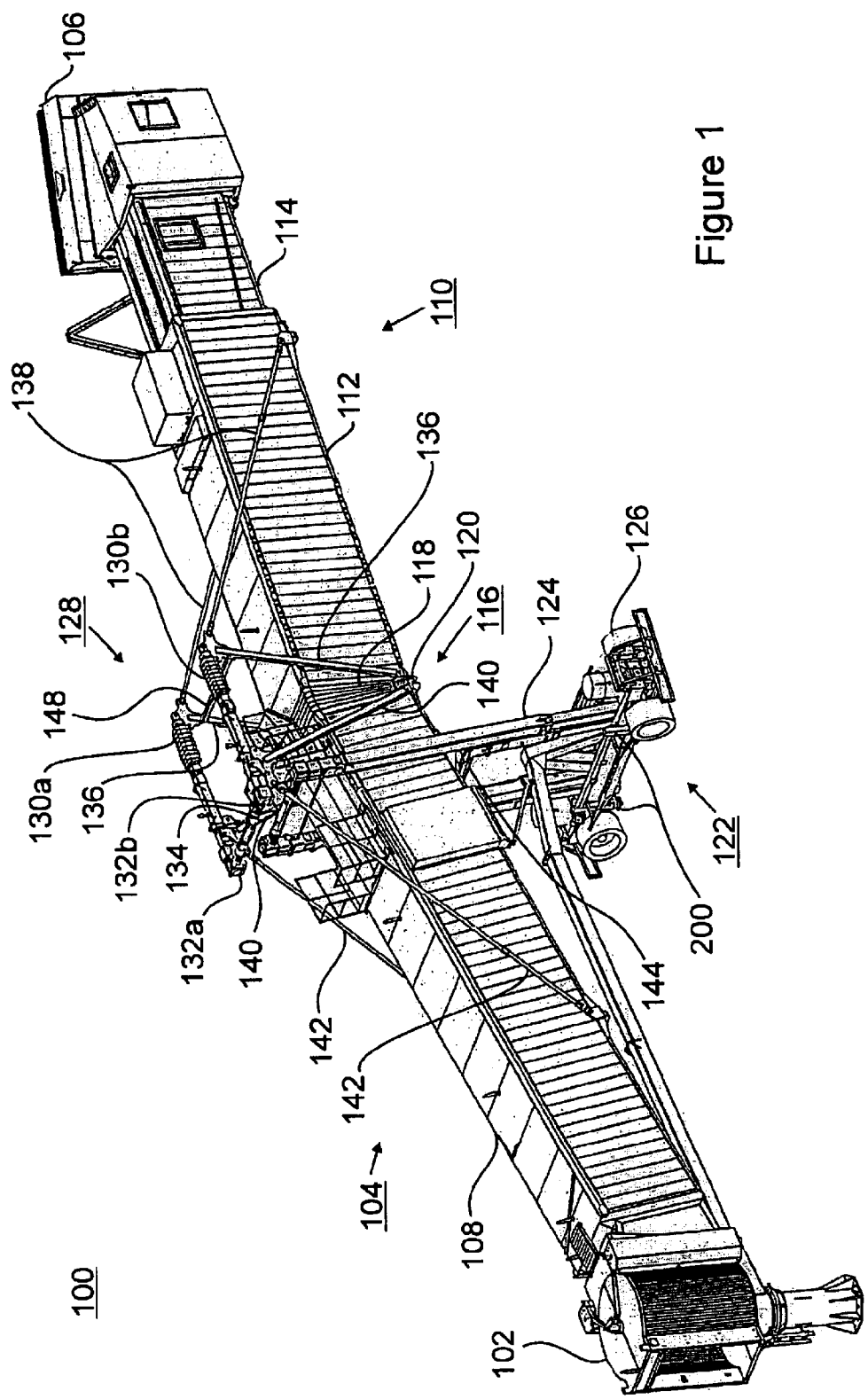
FIG. 1 is a side elevational view of an over-the-wing passenger boarding bridge including a supplemental lift system according to the instant invention.

Referring to FIG. 1, shown is a side elevational view of an over-the-wing passenger boarding bridge including supplemental lift system according to the instant invention. The passenger boarding bridge, shown generally at 100, extends from a support, such as for example a stationary rotunda 102. A passageway 104, ending with a pivotal cabin 106 for mating to a not illustrated rear doorway of a not illustrated aircraft, extends from the support. The passageway 104 comprises a fixed-length first passageway member 108 and a telescopic tunnel section 110. The fixed-length first passageway member 108 preferably includes a floor, two sidewalls and a ceiling. The telescopic tunnel section 110 includes outer and inner tunnel elements 112 and 114, respectively, wherein the inner element 114 is telescopically received within the outer element 112 such that the length of the tunnel section 110 is variable. Each tunnel element 112 and 114 preferably includes a floor, two sidewalls and a ceiling. Preferably, the fixed-length first passageway member 108 and the outer tunnel element 112 have substantially similar cross-sectional profiles when viewed end-on. A flexible connection 116 including a bellows-type canopy 118 and a floor connector 120 connects the outboard end of the first passageway member 108 and the inboard end of the outer tunnel element 112. For instance, a hinge is provided between the outboard end of the first passageway member 108 and the inboard end of the outer tunnel element 112, for pivotally mounting one to the other. The bellows-type canopy 118 is provided between the first passageway member 108 and the outer tunnel element 112 to provide weatherproof protection to passengers passing therebetween. Optionally, the flexible connection 116 includes a floor plate (not shown) to provide a level surface over which passengers move through the bridge. The flexible connection 116 supports a vertical swinging motion of the telescopic tunnel section 110 about a horizontal axis aligned with the floor connector 116, for instance a pivoting motion about the hinge.

The loading bridge 100 is for being cantilevered and extended over a not illustrated wing of a not illustrated nose-in parked aircraft, so as to service a rear doorway thereof. Accordingly, an inboard end of the first passageway member 108 is pivotally mounted to the stationary rotunda 102, preferably being at more or less the same elevation as the doorways along the lateral surface of the not illustrated aircraft. The first passageway member 108 is supported near the outboard end thereof by a main elevating mechanism in the form of a wheel carriage 122 including a height adjustable support post 124 and drive wheels 126. The drive wheels 126 are for achieving angular displacement of the passageway 104. Additional mechanisms (not shown) are provided for slidingly extending and retracting the inner tunnel element 114 relative to the outer tunnel element 112, to thereby affect the length of the passageway 104, and for pivoting the pivotal cabin 106. The height adjustable support post 124 preferably includes one of a hydraulic cylinder, a pneumatic cylinder and a ball-screw jack. Of course, other known mechanisms for moving the various bridge components relative to other bridge components are envisaged for use with the instant invention. Preferably, the height adjustable support posts 124 are mounted at a point along the length of the first passageway member 108 that is between approximately 10 feet and approximately 3 feet from the outboard end of the first passageway member 108. Most preferably, the height adjustable support posts 124 are mounted at a point along the length of the first passageway member 108 that is between approximately 8 feet and approximately 4 feet from the outboard end of the first passageway member 108. Mounting the height adjustable support posts 124 at a point distal from the outboard end of the first passageway member advantageously allows the wing of the aircraft to approach more closely to the flexible connection, absent any obstacles such as for instance one of a support post and a bridge supporting pedestal.

An overhead adjustable support system 128 is provided for supporting the telescopic tunnel section 110 relative to the passageway member 108. The overhead adjustable support system 128 supports a controlled vertical swinging motion of an outboard end of the telescopic tunnel section 110 relative to an inboard end of the telescopic tunnel section 110, about a horizontal axis aligned with the floor connector 116. Preferably, the overhead support system 128 includes two lift mechanisms 130a, 130b for being supported relative to a passenger boarding bridge 100. For example, the lift mechanisms are selected from a group comprising: electromechanical screws; hydraulic cylinders; and, pneumatic cylinders. The electromechanical screws are optionally provided as one of a ball-nut screw jack, a redundant ball-path screw jack and a screw jack including an acme thread. When the lift mechanisms are provided as electromechanical screws, each lift mechanism 130a, 130b is coupled to a not illustrated power transfer shaft of a motor 132a, 132b, respectively, which motors are coupled one-to the other via a drive-shaft 134. The drive-shaft 134 ensures that both motors 132a, 132b turn at a same speed, such that both sides of the telescopic tunnel section 110 are raised and lowered at a same rate. Preferably, the motors 132a, 132b are reversible electric motors including a break mechanism for substantially preventing extension of a corresponding one of the lift mechanisms 130a, 130b absent a control signal.

Referring still to FIG. 1, a first end of each lift mechanism 130a, 130b is coupled to the outer tunnel element 112 via first and second support members 136, 138, respectively. Similarly, a second end of each lift mechanism 130a, 130b is coupled to the first passageway member 108 via third and fourth support members 140, 142, respectively. Preferably, a cross-support member 148 is disposed between one first support member 136 adjacent to each opposite side of the telescopic tunnel section, so as to maintain a constant separation between first ends of the lift mechanisms 130a, 130b.

As mentioned above, the lift mechanisms 130a, 130b optionally are provided as self-locking mechanisms selected from the group comprising a redundant ball-path screw and an electromechanical screw including an acme thread. Since these mechanisms are inherently self-locking, the probability that the telescopic tunnel section 110 will damage a wing of an aircraft in the event of a failure of the lift mechanisms 130a, 130b is reduced. Optionally, the lift mechanisms 130a, 130b are provided as a chain drive mechanism, or as any suitable mechanism having a controllably variable length and sufficient mechanical strength to support the weight of the telescopic tunnel section 110.

Figure 2:
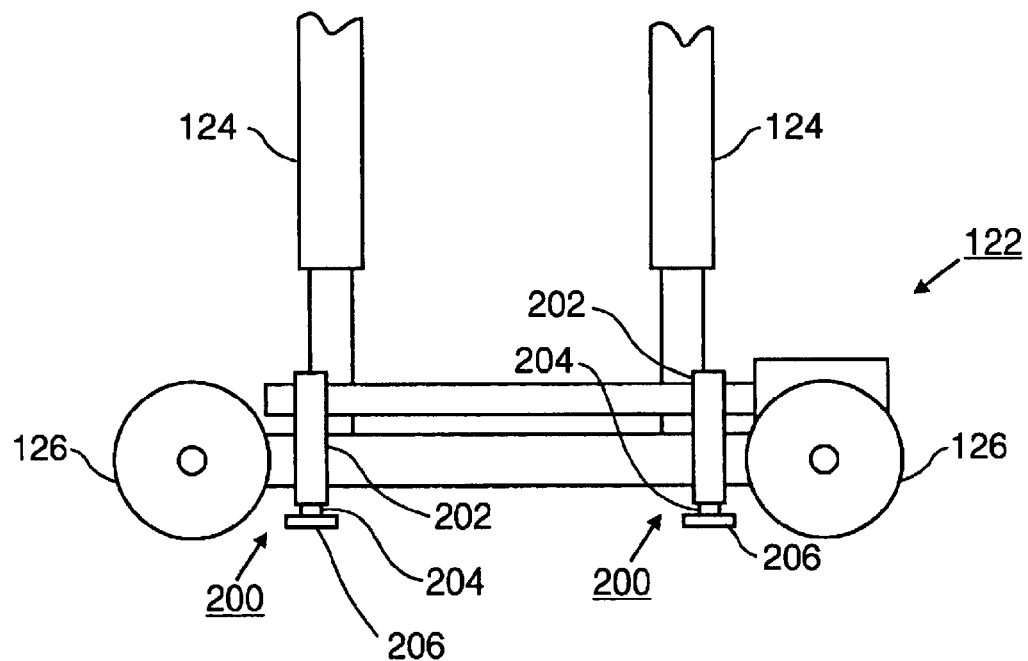
FIG. 2 is a simplified side view of the supplemental lift system according to the instant invention mounted to a wheel carriage of an over-the-wing passenger boarding bridge.

Referring now to FIG. 2, shown is a simplified side view of the supplemental lift system according to the instant invention mounted to a wheel carriage of an over-the-wing passenger boarding bridge. Elements labeled with the same numerals have the same function as those illustrated in FIG. 1. In a preferred embodiment, the supplemental lift system includes four jacks 200, two of which are shown in FIG. 2, mounted to the wheel carriage 122 of a passenger boarding bridge 100. Each jack 200 includes an inner suspension tube assembly 204 that is telescopically received within an outer suspension tube assembly 202. The outer suspension tube assembly 202 is fixedly mounted to the wheel carriage 122 by known means such as one of bolting and welding. A ground-engaging member 206 is mounted at a free end of the inner suspension tube assembly 204. Each jack 200 includes a mechanism in communication with a power source for extending the inner suspension tube assembly 204 relative to the outer suspension tube assembly 202. The mechanism and power source cooperate to extend the inner suspension tube assembly 204 to a length that is sufficient to raise the drive wheels 126 of the wheel carriage 122 out of contact with the ground. For instance, a non-limiting example of a suitable mechanism is a ball-screw jack mechanism including an electric motor, and some non-limiting example of a suitable power source are a gasoline or diesel powered portable generator, a fuel cell, and a storage battery. Optionally, the power source is replaced with a mechanism for manually extending the inner suspension tube assembly 204 relative to the outer suspension tube assembly 202. Further optionally, the power source provides power to the mechanism so as to extend the mechanism to a full-extension length. In other words, the mechanism is either fully retracted when not required, or fully extended when it is required. Of course, optionally a controller is provided such that the power source provides power to the mechanism so as to extend the mechanism in a controllable manner. In this last optional case, the drive wheels may be raised out of contact with the ground in a height-adjustable manner.

Figure 3:
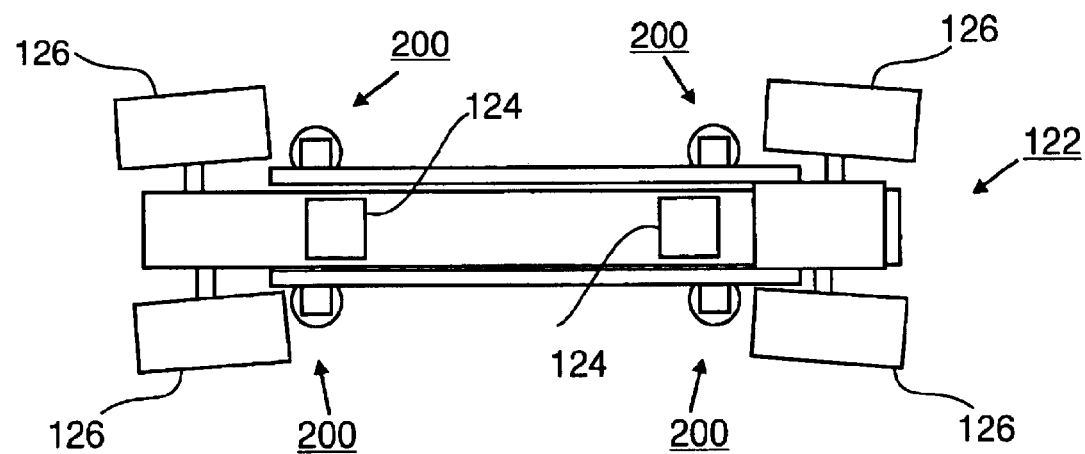
FIG. 3 is a simplified top view of the supplemental lift system according to the instant invention mounted to a wheel carriage of an over-the-wing passenger boarding bridge.

Referring now to FIG. 3, shown is a simplified top view of the supplemental lift system according to the instant invention, mounted to a wheel carriage of an over-the-wing passenger boarding bridge. Elements labeled with the same numerals have the same function as those illustrated in FIG. 2. As shown in FIG. 3, the four jacks 200 are preferably disposed one each adjacent to each drive wheel 126. Such an arrangement provides a wide support base, and is therefore stable. Optionally, the four jacks 200 are arranged differently relative to the wheel carriage 122. Further optionally, a number of jacks 200 other than four is provided. Preferably, at least two jacks 200 are provided, one each disposed proximate an opposite end of the wheel carriage 122 so as to provide a wide support base. In a less preferred embodiment, one jack is provided, the one jack being disposed approximately mid-way between the two sets of drive wheels and having a broad base designed to provide stability when the jack is in an extended condition.

Figure 4:
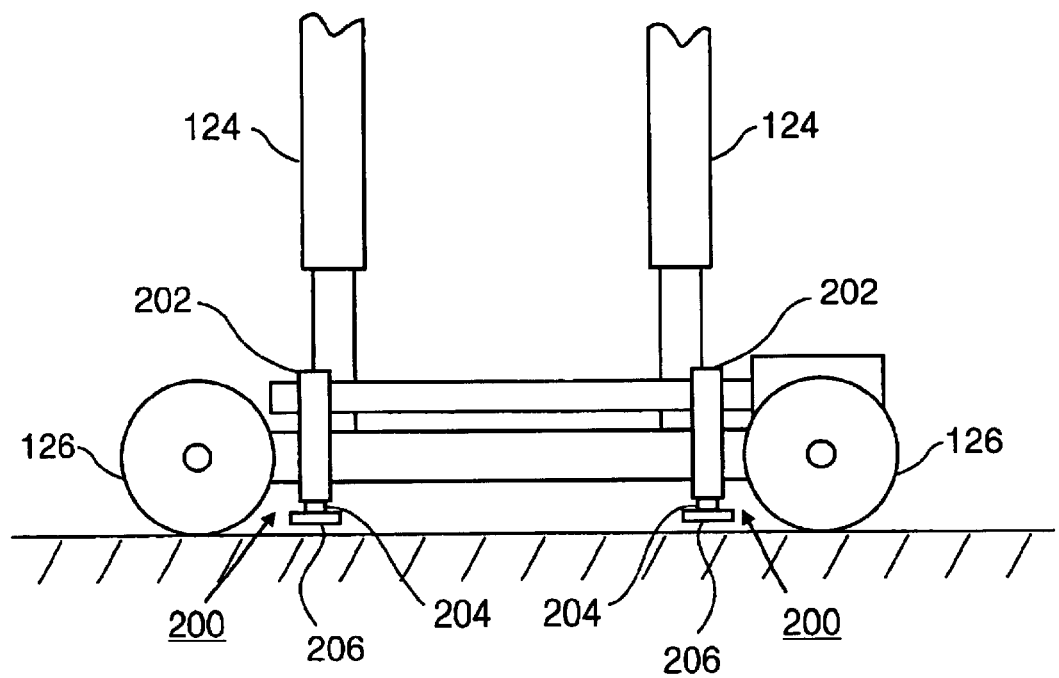
FIG. 4 is a view the supplemental lift system of FIG. 2 in a retracted condition.

Referring now to FIG. 4, shown is a view of the supplemental lift system of FIG. 2 in a retracted condition. Elements labeled with the same numerals have the same function as those illustrated in FIG. 2. FIG. 4 represents a "normal" operating condition of the boarding bridge, in which the drive wheels 126 engage the ground, and vertical adjustment of the telescopic tunnel section 110 is accomplished using the main height adjustable support posts 124 and/or the overhead adjustable support system 128. Each one of the four jacks 200, only two of which are shown in FIG. 4, is retracted such that the ground-engaging member 206 is distal to the ground.

Figure 5:
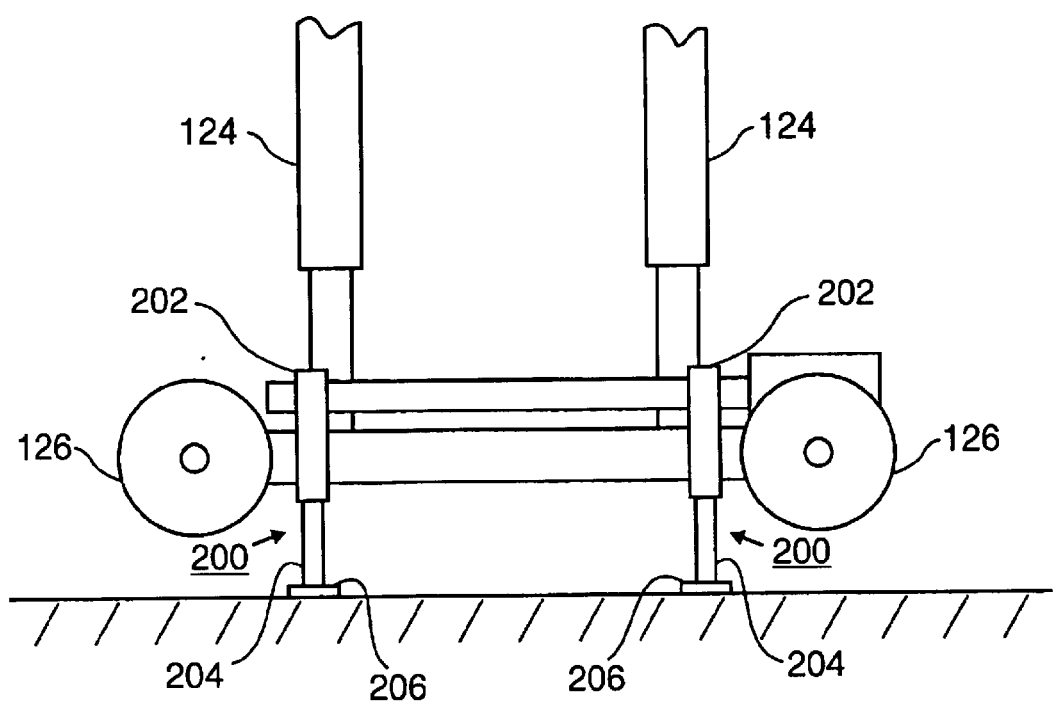
FIG. 5 is a view of the supplemental lift system of FIG. 2 in an extended condition.

Referring now to FIG. 5, shown is a view of the supplemental lift system of FIG. 2 in an extended condition. Elements labeled with the same numerals have the same function as those illustrated in FIG. 2. FIG. 5 represents an operating condition of the boarding bridge subsequent to failure of at least one of the main height adjustable support posts 124 and the overhead adjustable support system 128. The failure may be of a mechanical nature, or as a result of power loss to the boarding bridge. In case of such a failure, each one of the four jacks 200, only two of which are shown in FIG. 5, is extended such that the ground-engaging member 206 is brought into contact with the ground. Further extension of each one of the four jacks 200 raises the drive wheels 126 out of contact with the ground. In fact, the entire boarding bridge is pivoted upwardly about a horizontal axis aligned with a connection point between the first passageway member 108 and the support 102. The four jacks 200 thereafter maintain the boarding bridge in the pivoted upwardly position for at least a period of time that is sufficient to move an aircraft away from the boarding bridge.

Figure 6:
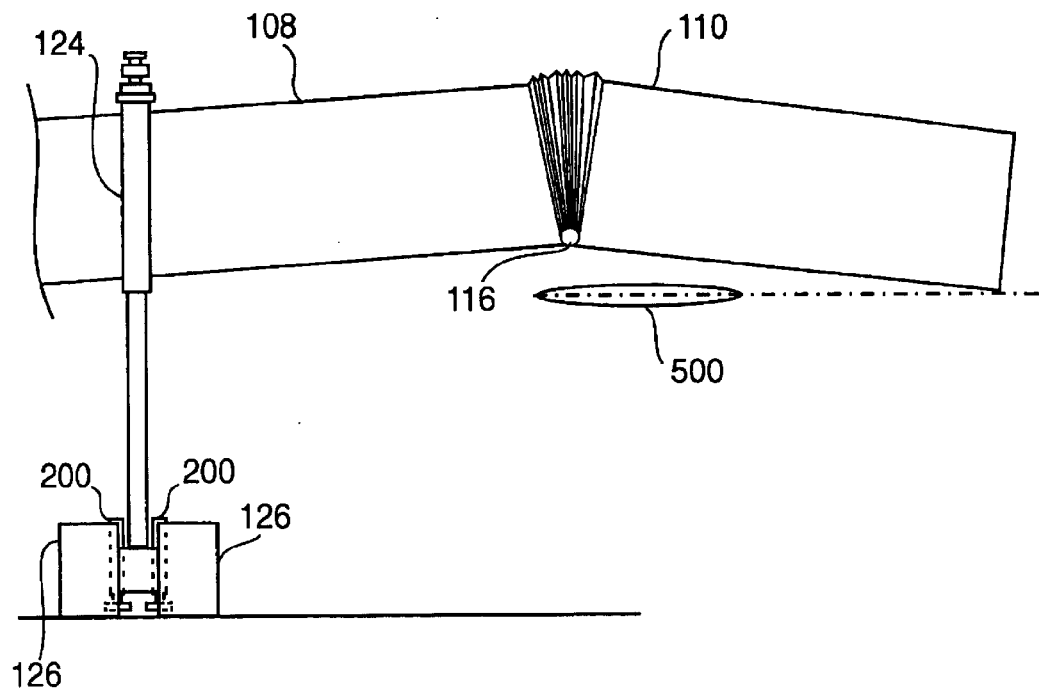
FIG. 6 is another view of the supplemental lift system of FIG. 2 in a retracted condition; and, FIG. 7 is another view of the supplemental lift system of FIG. 2 in an extended condition.

Referring now to FIG. 6, shown is another view of the supplemental lift system of FIG. 2 in a retracted condition.

Elements labeled with the same numerals have the same function as those illustrated in FIG. 2. Also shown in FIG. 6 is a wing 500 of a not illustrated aircraft having a not illustrated rear doorway to which a not illustrated cab mounted at the end of the telescopic tunnel section 110 is aligned. Accordingly, when the boarding bridge is aligned with the rear doorway of the not illustrated aircraft, at least a portion of the wing is disposed elevationally above a lower surface of the telescopic tunnel section. Prior to the aircraft moving away from the boarding bridge, the telescopic tunnel section 110 must be moved upwardly away from the aircraft, so as to provide sufficient safe clearance for the wing to pass therebelow.

Figure 7:
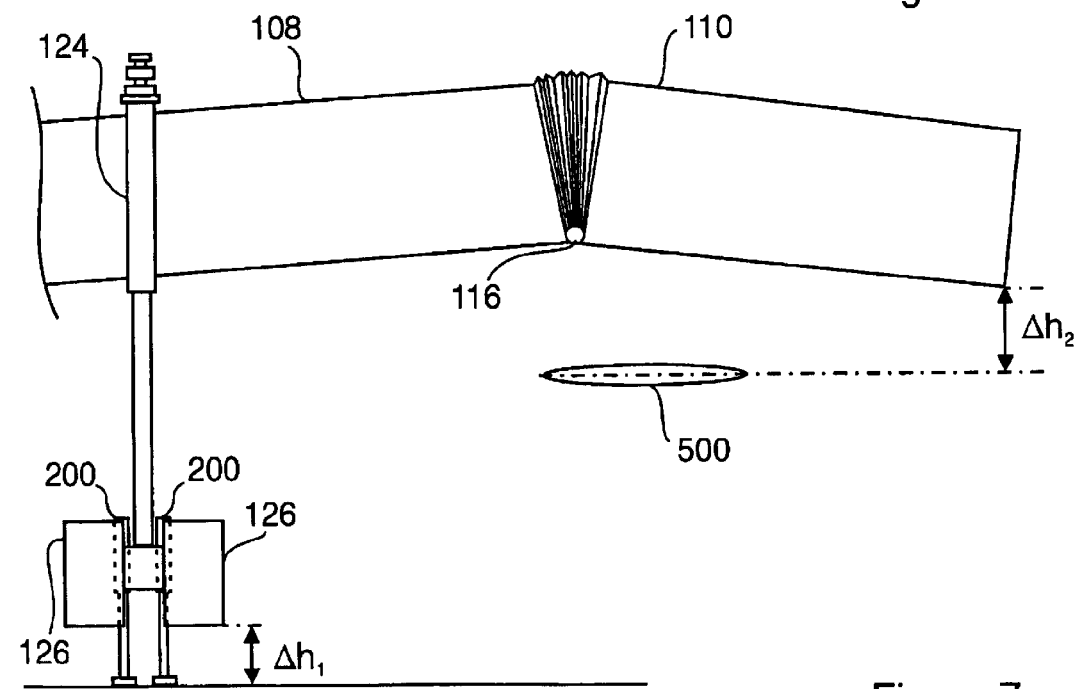

Referring now to FIG. 7, shown is another view of the supplemental lift system of FIG. 2 in an extended condition. Elements labeled with the same numerals have the same function as those illustrated in FIG. 2. FIG. 7 illustrates a situation in which the boarding bridge has suffered a failure that prevents the telescopic tunnel section 110 from being moved upwardly away from the aircraft in a normal manner. In this case, each one of the four jacks 200, only two of which are shown in FIG. 7, is extended so as to raise the drive wheels 126 out of contact with the ground. As shown in FIG. 7, the entire boarding bridge is pivoted upwardly about a not shown horizontal axis that lies outside of the left-edge of the drawing. Advantageously, the outboard end of the boarding bridge is pivoted upwardly about a horizontal pivot axis disposed at the inboard end of the boarding bridge. Accordingly, using the jacks 200 to raise the boarding bridge by an amount $\Delta h_1$ at the wheel carriage results in a larger vertical displacement $\Delta h_2$ at the outboard end of the boarding bridge. Such a mechanical advantage allows shorter jacks to be used to achieve a desired elevation at the outboard end of the boarding bridge, relative to a system in which jacks are disposed at the outboard end of the boarding bridge. Still referring to FIG. 7, the vertical displacement $\Delta h_2$ at the outboard end of the boarding bridge is sufficient to allow the wing 500 of the not illustrated aircraft to pass therebelow. Accordingly, it is possible to move the aircraft away from the boarding bridge, even in the event that the boarding bridge suffers a failure.

In the above-described embodiment of the instant invention, the jacks of the supplemental lift system are provided as electromechanical screws. Optionally, the jacks of the supplemental lift system are provided as one of hydraulic cylinder jacks and pneumatic cylinder jacks. In this case, a pump for supplying fluid to the hydraulic or pneumatic cylinder jacks is provided in communication with the jacks. Of course, a power source is also provided for supplying power to operate the pump. Advantageously, two or more hydraulic or pneumatic cylinder jacks being operated using a same pump will auto-level, such that each of the jacks is extended at a same rate.

Of course, the passenger boarding bridge 100 shown at FIG. 1 is a specific and non-limiting example of one type of passenger boarding bridge with which the supplemental lift system according to the instant invention may be used. It will be obvious to one of skill in the art that the supplemental lift system according to the instant invention could be used with any type of passenger loading bridge having an over-the-wing tunnel section that is supported in a height-adjustable manner by elevating columns carried by a wheel carriage.

Numerous other embodiments may be envisaged without departing from the spirit and scope of the invention.

What is claimed is:

1. A passenger boarding bridge having an inboard end for being pivotally mounted to a support and including a tunnel section for being extended over the wing of an aircraft in a cantilever-like fashion, the passenger boarding bridge comprising:

a main elevating mechanism mounted to a wheel carriage of the passenger boarding bridge for supporting the tunnel section in a height adjustable manner;

at least a jack including a first portion mounted to the aircraft passenger boarding bridge at a point that is distal from an outboard end thereof, and a second portion having a first end for being telescopically received within the first portion such that a length of the jack is variable, and a second end for engaging an area of the ground that is elevationally below the aircraft passenger boarding bridge; and, a power source in communication with the at least a jack for providing power for extending the length of the jack, wherein extending the length of the at least a jack translates into an upward motion of the wheel carriage for elevating the outboard end of the passenger boarding bridge relative to the inboard end of the passenger boarding bridge and independently of the main elevating mechanism.

2. A passenger boarding bridge according to claim 1 wherein the power source is separate from a main power source of the passenger boarding bridge.

3. A passenger boarding bridge according to claim 2 wherein the power source is selected from a group comprising: a portable gasoline powered generator; a portable diesel powered generator; a fuel cell; and, a storage battery.

4. A passenger boarding bridge according to claim 1 wherein the at least a jack comprises a mechanism in communication with the power source, the mechanism for relatively moving the first portion and the second portion so as to vary the length of the jack.

5. A passenger boarding bridge according to claim 4 wherein the mechanism comprises an electromechanical ball screw.

6. A passenger boarding bridge according to claim 4 wherein the mechanism is a self-locking mechanism comprising one of a redundant ball-path screw and a screw having an acme thread.

7. A passenger boarding bridge according to claim 1 wherein the first portion of the jack is fixedly mounted to the wheel carriage of the aircraft passenger boarding bridge.

8. A passenger boarding bridge according to claim 7 wherein the at least a jack comprises two separate jacks mounted one each proximate opposite ends of the wheel carriage.

9. A passenger boarding bridge according to claim 7 wherein the at least a jack comprises four separate jacks including two jacks mounted one each proximate opposite ends along a first side of the wheel carriage and two other jacks mounted one each proximate opposite ends along a second side of the wheel carriage opposite the first side.

10. A passenger boarding bridge according to claim 9 wherein each jack of the four separate jacks includes a separate ground-engaging member mounted at a free end of the jack, the separate ground engaging member having a surface area larger than a cross-sectional surface area taken in a plane normal to a length of the jack.

11. A passenger boarding bridge according to claim 1 wherein the at least a jack is selected from a group comprising: a hydraulic cylinder jack; and, a pneumatic cylinder jack.

12. A passenger boarding bridge according to claim 1 wherein a vertical displacement of the aircraft passenger boarding bridge at the point that is distal from the outboard end effects a larger vertical displacement of the outboard end of the aircraft passenger boarding bridge.

13. A passenger boarding bridge according to claim 1, comprising a connector disposed proximate the inboard end of the passenger boarding bridge, far pivotally mounting the passenger boarding bridge to a support, and for supporting a vertical swinging motion of the outboard end of the passenger boarding bridge about a horizontal axis aligned with the connector.

14. A passenger boarding bridge according to claim 13, wherein the inboard end is pivotally mounted to a support via the connector, and wherein the support is a stationary support.

15. A supplemental lift system for an over-the-wing aircraft passenger boarding bridge, the over-the-wing aircraft passenger boarding bridge having an inboard end for being pivotally mounted to a support and including a tunnel section for being extended over the wing of an aircraft in a cantilever-like fashion, the tunnel section supported in a height adjustable manner by an elevating mechanism mounted to a wheel carriage, the supplemental lift system comprising:

a plurality of height-adjustable jacks mounted to the wheel carriage of the over-the-wing aircraft passenger boarding bridge, each height-adjustable jack of the plurality of height-adjustable jacks including a ground engaging end and being operable between a retracted position in which the ground engaging end other than supports a substantial portion of a weight of the over-the-wing passenger boarding bridge and an extended position in which the ground engaging end supports a substantial portion of a weight of the over-the-wing passenger boarding bridge, wherein, operating each height-adjustable jack of the plurality of height-adjustable jacks from the retracted position to the extended position translates into an upward motion of the wheel carriage for elevating the tunnel section relative to the inboard end of the passenger boarding bridge and independently of the main elevating mechanism.

16. A supplemental lift system according to claim 15 wherein each height-adjustable jack of the plurality of height-adjustable jacks comprises an electromechanical screw.

17. A supplemental lift system according to claim 15 wherein each height-adjustable jack of the plurality of height-adjustable jacks is extensible to a length that is sufficient for vertically displacing a wheel carriage of a passenger boarding bridge.

18. A supplemental lift system according to claim 17 comprising a power source separate from a main power source of a passenger loading bridge, the power source in communication with each height-adjustable jack of the plurality of height-adjustable jacks for providing power thereto.

19. A supplemental lift system according to claim 18 wherein the power source is selected from a group comprising: a portable gasoline powered generator; a portable diesel powered generator; a fuel cell; and, a storage battery.

20. A supplemental lift system according to claim 17 wherein each height-adjustable jack of the plurality of height-adjustable jacks comprises a mechanism in communication with the power source, the mechanism for relatively moving the first portion and the second portion so as to extend the length of the jack.

21. A supplemental lift system according to claim 20 wherein the mechanism comprises an electromechanical ball screw.

22. A supplemental lift system according to claim 20 wherein the mechanism is a self-locking mechanism comprising one of a redundant ball-path screw and a screw having an acme thread.

23. A method of elevating an outboard end of an over-the-wing passenger boarding bridge comprising the steps of:

providing at least a jack, the at least a jack mounted to a portion of the over-the-wing passenger boarding bridge at a point that is distal from the outboard end, the at least a jack being operable independently of a main elevating mechanism of the over-the-wing bridge;

providing a source of power for extending a length of the at least a jack; and subsequent to a failure of the main elevating mechanism of the over-the-wing passenger boarding bridge, the failure preventing movement of a lower surface of the over-the-wing passenger boarding bridge to an elevation that is sufficient to provide a minimum safe clearance between the lower surface of the over-the-wing passenger boarding bridge and an upper surface of a wing of an aircraft, extending the length of the at least a jack by an amount that is sufficient to engage the ground and to elevate the outboard end so as to provide the minimum safe clearance between a lower surface of the over-the-wing passenger boarding bridge and an upper surface of a wing of an aircraft.

* * * * *